R. DAAE.
GAS PRODUCER.
APPLICATION FILED AUG. 23, 1911.

1,034,695.

Patented Aug. 6, 1912.
3 SHEETS—SHEET 1.

WITNESSES:
R. A. Balderson
W. Samariss

INVENTOR.
R. Daae,
BY Bakewell, Byrnes Parmelee
ATTORNEYS.

R. DAAE.
GAS PRODUCER.
APPLICATION FILED AUG. 23, 1911.

1,034,695.

Patented Aug. 6, 1912.
3 SHEETS—SHEET 2.

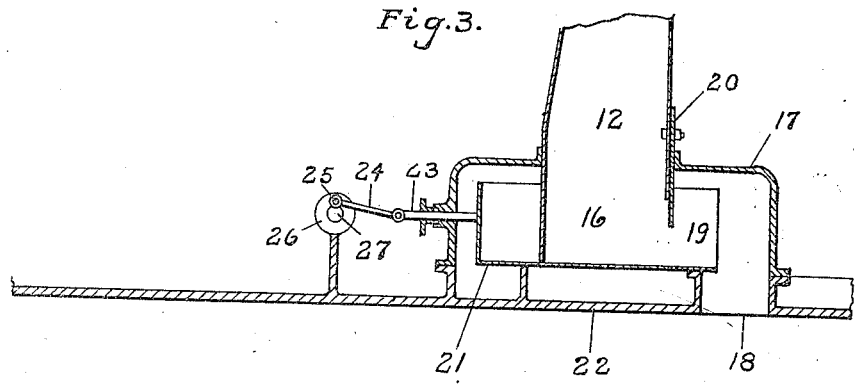
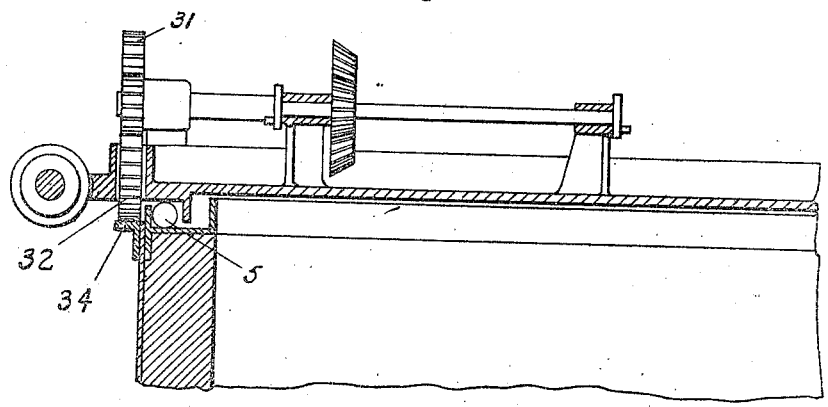

UNITED STATES PATENT OFFICE.

REINHARDT DAAE, OF PITTSBURGH, PENNSYLVANIA.

GAS-PRODUCER.

1,034,695.  Specification of Letters Patent.  Patented Aug. 6, 1912.

Application filed August 23, 1911. Serial No. 645,639.

*To all whom it may concern:*

Be it known that I, REINHARDT DAAE, of Pittsburgh, Allegheny county, Pennsylvania, have invented a new and useful Improvement in Gas-Producers, of which the following is a full, clear, and exact description, reference being had to the accompanying drawings, forming part of this specification, in which—

Figure 1:
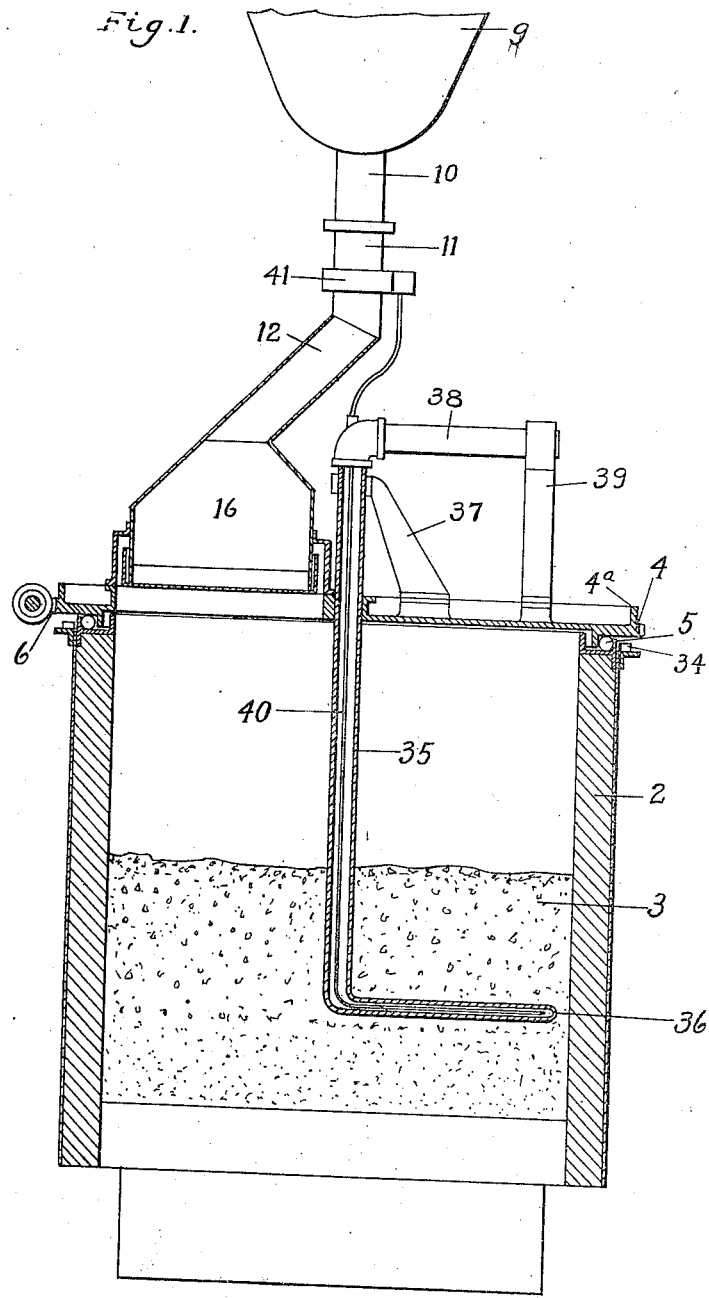
Figure 2:
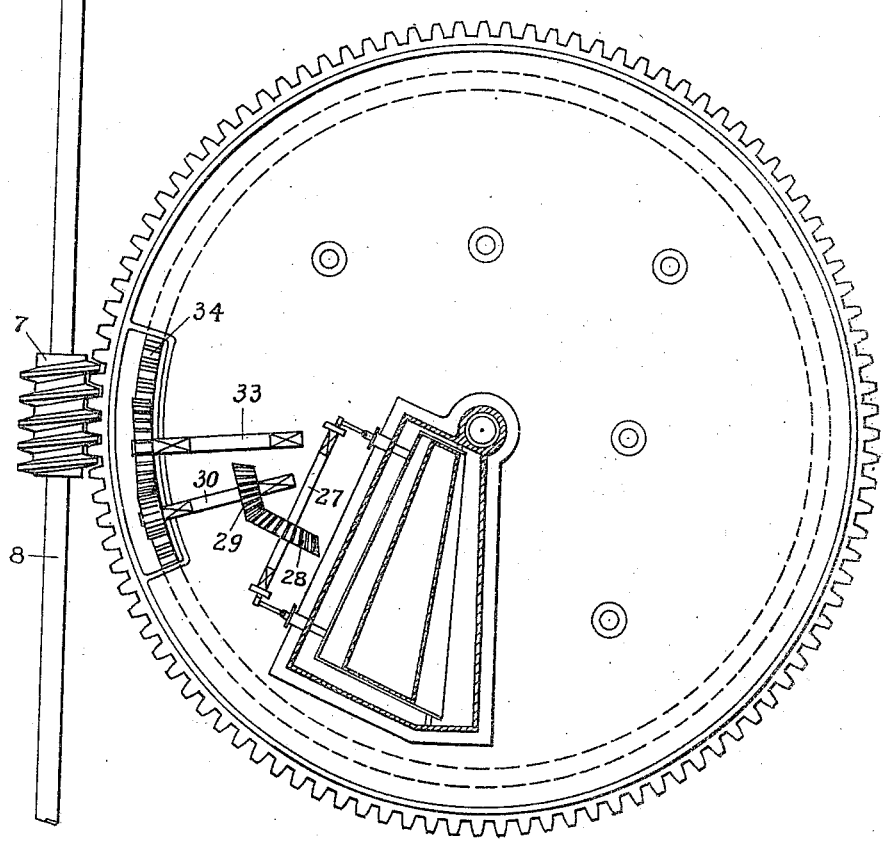
Figure 6:
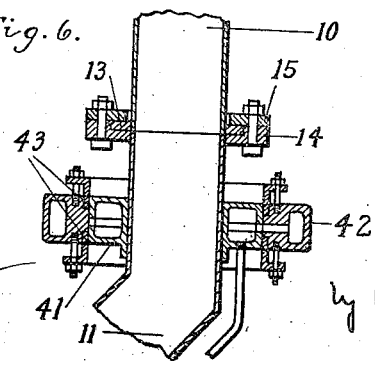

Figure 1 is a sectional elevation of a gas producer embodying my invention; Fig. 2 is a plan view, partly in section, showing the arrangement of the gearing; Fig. 3 is a detail sectional view showing the feeding apparatus; Fig. 4 is a detail sectional view showing the gearing; Fig. 5 is a detail view of one form of poker which may be employed; and Fig. 6 is a detail view showing the joint in the fuel feed pipe and the adjacent parts.

My invention has relation to gas producers, and has for its object to provide means of novel and effective character for feeding the fuel to the producer in a manner which will obtain an effective distribution thereof.

The nature of my invention will be best understood by reference to the accompanying drawings, in which I have shown the preferred embodiment thereof, and which will now be described, it being premised, however, that various changes may be made in the details of construction and arrangement of the parts by those skilled in the art without departing from the spirit and scope of my invention as defined in the appended claims.

In these drawings, the numeral 2 designates a gas producer, which, in so far as its body portion is concerned, may be of any approved or usual type.

3 indicates the bed of fuel in the producer.

4 is a rotary top mounted upon the upper end of the vertical walls of the producer, preferably upon suitable anti-friction bearings 5. This top is provided with peripheral worm teeth 6, which mesh with a worm 7 on a driving shaft 8, driven by any suitable source of power (not shown). In lieu of the worm gearing, any other suitable gearing may be provided for obtaining a slow, constant rotation of the producer top.

9 designates a portion of a stationary fuel feed hopper, supported in any suitable manner and having a depending discharge pipe 10. This discharge pipe has its vertical axis coincident with the vertical axis of the producer, and communicates at its lower end with the vertical portion 11 of a bent feed pipe 12, which is mounted upon and rotates with the rotary top 4. The pipes 10 and 11 are connected by any suitable rotary joint. In Fig. 6 I have shown one form of such joint, in which the pipe section 10 has a flange 13 at its lower end; the pipe member 11 has a flange 14 at its upper end with an upturned portion embracing the flange 13; and a cap ring 15 secured to the flange 14 and extending inwardly over the flange 13. The lower end of the pipe 12 is enlarged as shown at 16, and extends downwardly into a feed chamber 17 mounted on the rotating top and communicating with the interior of the producer by a feed opening 18. One side of the enlarged portion 16 is cut away to form a discharge opening 19 (see Fig. 3), the size of which opening may be controlled by a vertically adjustable gate 20.

21 is a horizontally reciprocating feed box or slide, which is mounted within the chamber 17, and into which the portion 16 of the pipe 12 extends. This box is arranged to reciprocate on suitable supports 22, and may be periodically reciprocated by any suitable arrangement of gearing. In the arrangement shown, this box is provided with rods 23 connected by a pitman 24 with crank pins 25 or crank wheels 26, which are mounted on a shaft 27. The shaft 27 carries a beveled gear wheel 28, which meshes with a bevel gear wheel 29 on a radial shaft 30. The shaft 30 carries a spur pinion 31, which meshes with a spur pinion 32 on a shaft 33. The teeth of the spur wheel 32 engage with the teeth and circular rack 34 secured to the upper exterior portion of the producer. By means of this or other suitable arrangement of gearing, the feed box 31 is periodically reciprocated within the chamber 17. The fuel is constantly fed to the pipe 12 from the hopper 9, and at each reciprocation of the feed box a portion of the fuel and the lower enlarged portion 16 will be carried out and discharged in the producer through the opening 18. As this opening is in the revolving top, it will be seen the successive portions of the fuel are discharged at different points around the circumference of the furnace, thus giving a substantially fine fuel distribution.

The feed mechanism described can be operated successfully with fuel which varies largely in size without danger of clogging or choking, since the reciprocating feed box will clear itself at each reciprocation.

In order to provide for a suitable agitation of the fuel and fuel bed 3, I provide the rotating top 4 with a poker extending downwardly into the fuel bed. In the form shown in the drawings, this poker consists of a hollow pipe member 35 terminating at its lower end in a hollow horizontal arm 36, which is preferably curved in the manner shown in Fig. 5 so as to more readily cut and work its way through the bed of fuel. The poker extends upwardly through a suitable guide 37 secured to the rotating top, and is preferably pressed at its upper end by the horizontal arm 38, which extends laterally into a support 39 rising from the rotating top. Extending downwardly through the hollow poker and into the horizontal arm thereof is a water supply pipe 40, which discharges water into the poker near the extremity of the arm 36. This pipe 40 may receive its supply of water in any suitable manner. In Fig. 6 I have shown it as extending upwardly into a supply chamber 41, which is secured to the pipe member 11 to rotate therewith, and which is fed with water from a chamber 42 which surrounds the box 41. The box 41 is arranged to rotate within the surrounding chamber 42, a suitable packing 43 being interposed between the parts. The water discharged by the pipe 40 flows upwardly through the poker and out through the horizontal arm 38, and may be discharged onto the rotating top, which, as shown, has a marginal flange 4ª constituting a water pan. The overflow from this pan will be taken care of in any suitable manner not shown.

The advantages of my invention will be apparent to those skilled in the art, since it provides an automatic fuel feeding apparatus which is simple in its construction, reliable in its operation, and by means of which a proper distribution of the fuel may be automatically obtained. By the proper timing of the actuating gearing, the discharge of fuel may be made to occur at the desired intervals; and by regulating the discharge opening by the position of the gate 20, the amount of fuel fed at each discharge may also be controlled.

The rotating water-cooled poker above described forms an effective means for maintaining the fuel bed in its proper condition.

It will be obvious that the details of the apparatus may be widely changed without departing from the spirit and scope of my invention as defined in the appended claims. Thus, different forms of pokers may be used; the means of supplying water to the poker may be changed; and the details of the fuel feed pipe and feed slide, together with the actuating gearing therefor may also be varied.

What I claim is:—

1. Fuel-feeding mechanism for gas producers, comprising a rotating producer top having a feed opening therethrough, a feed chamber carried by said top, a reciprocating frictional feed box mounted in said chamber; a fuel feed pipe extending downwardly and discharging into said box, and means for periodically reciprocating said box; substantially as described.

2. In a gas producer, the combination with a rotating producer top having a feed opening therethrough, of a frictional feed box mounted on the producer top adjacent to said opening and arranged to feed fuel during its return stroke, means for periodically reciprocating said box, and a fuel feed pipe extending downwardly and discharging onto the feed box, there being an opening in the fuel feed pipe adjacent to the opening through the producer top, said opening being arranged to permit the fuel to spread on the bottom of the feed box during the forward stroke thereof; substantially as described.

3. In a gas producer, the combination with a rotating producer top having a feed opening therethrough, of a frictional feed box mounted on the producer top adjacent to said opening and arranged to feed fuel during its return stroke, means for periodically reciprocating said box, a fuel feed pipe extending downwardly and discharging onto the feed box, there being an opening in the fuel feed pipe adjacent to the opening through the producer top, said opening being arranged to permit the fuel to spread on the bottom of the feed box during the forward stroke thereof, and means for adjusting the size of the opening in the fuel feed pipe; substantially as described.

In testimony whereof, I have hereunto set my hand.

REINHARDT DAAE.

Witnesses:
  A. F. TIBBETTS,
  H. M. CORWIN.